United States Patent [19]

Pisarski et al.

[11] 3,910,258

[45] Oct. 7, 1975

[54] CEREBRAL ACTIVITY MONITOR

[75] Inventors: Lech Pisarski; Adelbert W. Valiensi, both of Los Angeles; Lee R. Baessler, Manhattan Beach; Harvey F. Glassner, Los Angeles, all of Calif.

[73] Assignee: Humetrics Corporation, Los Angeles, Calif.

[22] Filed: Apr. 18, 1974

[21] Appl. No.: 462,123

[52] U.S. Cl. ............................................ 128/2.1 B
[51] Int. Cl.² .......................................... A61B 5/04
[58] Field of Search...... 128/2.06 A, 2.06 B, 2.06 F, 128/2.06 R, 2.1 B, 2.1 R

[56] References Cited
UNITED STATES PATENTS

| | | | |
|---|---|---|---|
| 2,902,080 | 9/1959 | Kennedy et al. | 128/2.1 M |
| 3,518,983 | 7/1970 | Jorgensen | 128/2.06 A |
| 3,518,986 | 7/1970 | Weeds et al. | 128/2.06 B |
| 3,587,563 | 6/1971 | Ragsdale | 128/2.06 A |
| 3,699,947 | 10/1972 | Maynard | 128/2.1 B |
| 3,706,308 | 12/1972 | John et al. | 128/2.1 B |
| 3,721,230 | 3/1973 | Ziernicki | 128/2.1 B |
| 3,760,796 | 9/1973 | Baessler et al. | 128/2.1 B |

Primary Examiner—William E. Kamm

[57] ABSTRACT

A brain wave signal monitor with a warning device actuated by failure of the signals to be present at a preselected minimal level for a specific period of time. The warning device is actuated by a circuit that remains locked in the actuating condition until reset by an attendant. A delay circuit controls the minimum rate by preventing actuation of the warning device until a predetermined time has elapsed since the last brain wave signal. A circuit tuned to the local power line frequency receives signals from electrodes on the patient and provides a second type of warning signal if an electrode becomes dislodged. A third signal circuit is actuated if the power supply voltage drops too low. The second and third warning signals are generated by selectively pulsing a calibration signal generator. The latter also supplies signals of known amplitude to the input circuit. An electrically controlled switching circuit can switch selected electrodes or the calibration signal to the input amplifier.

17 Claims, 4 Drawing Figures

CEREBRAL ACTIVITY MONITOR

BACKGROUND OF THE INVENTION

This invention relates to the monitoring of cerebral activity of patients and particularly to apparatus for monitoring electrical brain wave signals of patients close to cerebral death and for actuating a warning device in the event of diminution of the rate of occurrence of such signals below a predetermined value.

With the advent of sophisticated electronic components and the advanced physiological techniques, the past decade has brought the science of patient monitoring to the forefront in both acute and chronic situations. Clinical data has conclusively attested to the importance of sensing and analyzing body functions as a means of defining, in objective fashion, the patient's medical status. It is now an accepted medical practice to monitor the heart, lungs, blood biochemical levels, and other physiological data in emergency rooms, coronary care wards and post-surgical rooms.

Electroencephalographic (EEG) apparatus capable of monitoring brain wave signal voltages has existed for years. Such apparatus obtains electrical signals of small amplitude (in the range of microvolts) by means of electrodes placed in contact with areas of the patient's scalp, for example the occipital and frontal areas. The EEG signals are amplified and recorded on oscillographs, but, unlike other physiologic signals, this information has been difficult to interpret without the aid of a skilled electroencephalographer. This difficulty has excluded, for all practical purposes, the utilization of the EEG in patient monitoring on a continuous basis.

Recent work described in U.S. Pat. No. 3,760,796 has provided experience in the area of EEG sensing and analysis and has also provided the incentive to meet a clinical challenge related to brain exploration and the recently defined clinical state of "death."

The general monitoring capabilities within hospitals have presented daily occurrences of patients who have electrocardiogram (ECG) signals and blood pressure, but whose brain waves indicate electrocerebral silence. Such patients may be considered cerebrally dead. The American Electroencephalographic Society has issued criteria, which when met, define a brain that is not only unable to function in any normal capacity but has reached a condition that will not reverse itself. The general approach today in medicine is one in which the electrocerebrally silent patient is considered beyond medical aid. Further attempts to revive or even prolong the apparent life of such a patient are, by definition, questionable, and with the acceptance of the family, may be terminated. This new acceptance of a clinical determination of death is of importance, for example, when it is necessary to decide either to continue medical support or that death has occurred, permitting the deceased patient's organs to be used for transplant purposes. It is well-known that not all unconscious patients are cerebrally dead, and it is of supreme importance not to mistake an unconscious patient for one who is dead.

Certainly, a simple technique for recognizing the presence of possible cerebral death, or its impending arrival, is of unique importance in clinical medicine. It is a primary object of the present invention to provide means for reliably and inexpensively monitoring a patient for either acute or chronic purposes. A further object is to alert medical personnel to the possible electrocerebral silent state of such patients so that further neurological examinations may be considered.

SUMMARY OF THE INVENTION

The cerebral activity monitor of this invention includes an input circuit to be attached to EEG electrodes. The circuit includes input terminals and a differential amplifier used as a pre-amplifier. Between the input terminals and the pre-amplifier are electronic switching circuits to connect selected sets of the electrodes to the pre-amplifier. The input terminals, switching circuits, and pre-amplifier may be located in a cabinet, or box, close to the patient and at some distance from the main part of the monitoring apparatus. The switching circuits can be remotely controlled from the main apparatus, and the weak signal derived from the electrodes attached to the patient can be amplified by the pre-amplifier before being transmitted any great distance. As a result, any noise signals picked up in the transmission circuit to the main apparatus will have a much lower amplitude than the information signal from the pre-amplifier.

The main part of the apparatus may also include a calibration signal generator to transmit a signal of a predetermined amplitude to the input of the pre-amplifier. The calibration signal is also transmitted at relatively high amplitude so that it will not pick up significant noise signals en route, and it is attenuated at the pre-amplifier location to a level corresponding to the expected signal from the patient. This signal of known amplitude is amplified by the pre-amplifier and should return to the main part of the apparatus at a known level. If there is any discrepancy, the circuit can be examined and corrected.

The switching circuits to substitute the calibration signal for the signal from a patient are also controlled from the main part of the apparatus and can be used, not only in setting up the apparatus, but at any time during operation, if an attendant desires to do so.

The apparatus is primarily used to provide only a "yes-no" type of information, although an EEG type signal can be extracted from an output connector provided at the main part of the apparatus and can be recorded for analysis by an electroencephalographer. Since the "yes-no" type of signal is to be used to warn an attendant of some significant, adverse change in the patient's cerebral condition, the apparatus includes a warning device that clearly indicates such a change. The warning is preferably audible so that it cannot easily be ignored but may also be visible.

There are two other major conditions that must be called to the attendant's attention. One is that one or more of the electrodes has become dislodged from the patient. The other is that the power supply battery is too weak to provide a trustworthy source for the important and delicate monitoring. The calibration section of the circuit includes means to apply a pulsating signal to the warning circuit if an electrode becomes dislodged. A comparison circuit connected to the battery supply also actuates the warning circuit if the battery voltage drops too low, but the warning device produces noticeably different warning signals for each of the three conditions, that is: for diminished cerebral activity, for a dislodged electrode, and for a weak battery.

Moreover, the warning circuit includes means to keep the warning device activated until the circuit is specifically reset, if the warning device is actuated by a diminished cerebral activity signal from the patient. If the warning device is actuated only by a dislodged electrode or by a weak battery, it is deactivated as soon as the electrode is put back in place or the battery is replaced, whichever is necessary. The circuit also includes means to assure that the warning device actuating signal corresponds to pulsations in the dislodged electrode signal and the weak battery signal, thus assuring a contrast from the continuous warning in response to diminished cerebral activity.

Furthermore, the signal path of the cerebral activity signal includes a specific time delay circuit and switching circuit to delay the operation of the warning device until a certain time, for example five seconds, has elapsed since the last signal indicating cerebral activity. This prevents the warning device from being actuated too frequently and thereby summoning an attendant with false alarm signals.

DETAILED DESCRIPTION OF THE INVENTION

Figures 1, 2:
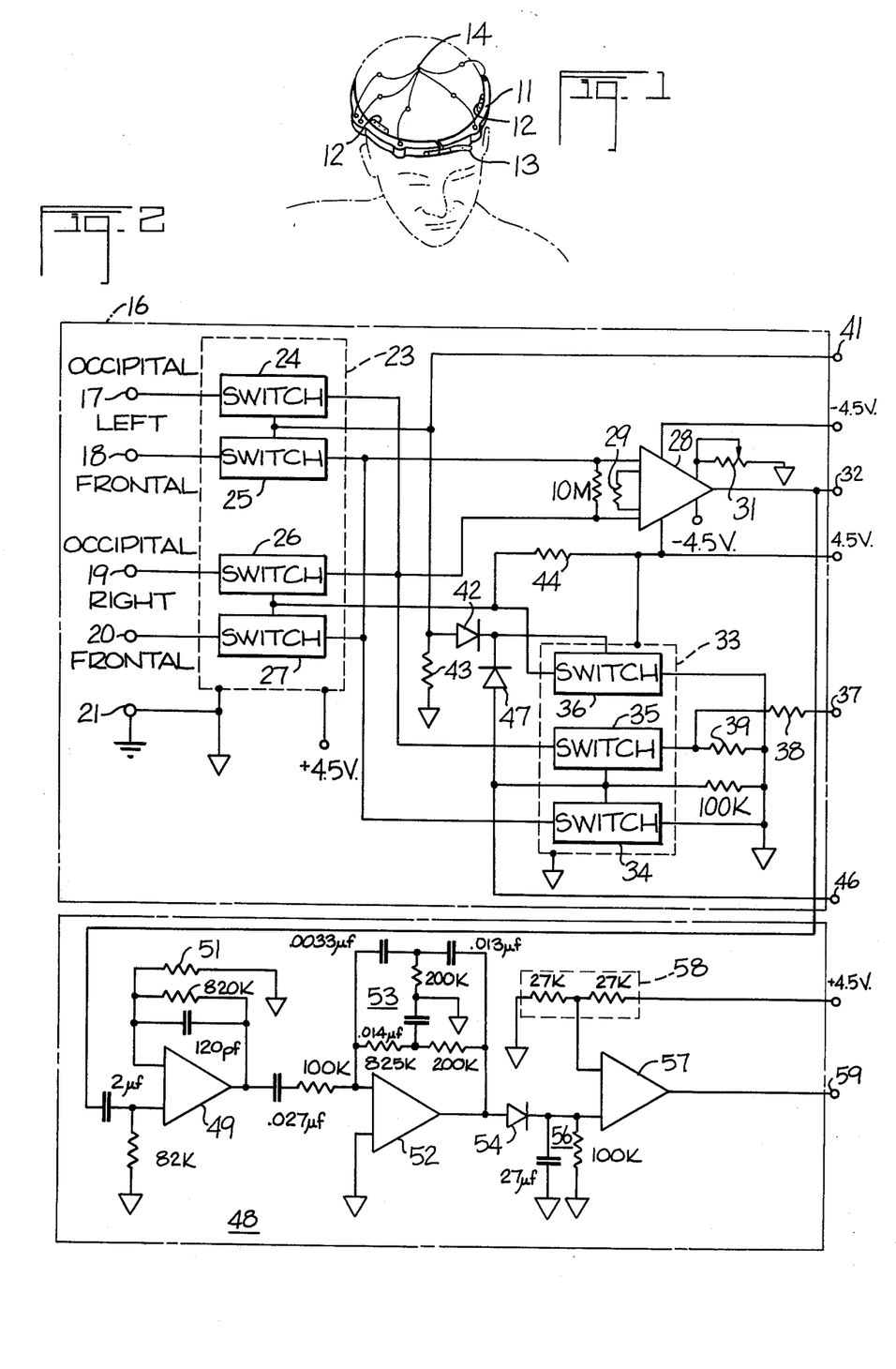
FIG. 1 is a perspective view of a prior art harness for EEG electrodes.
FIGS. 2–4 are schematic circuit diagrams that combine to form a complete diagram of the monitoring circuit of this invention.

The apparatus of the present invention must be attached to electrodes properly placed on a patient's head. Any suitable means may be used for holding the electrodes in their correct locations, and one such electrode support is described in U.S. Pat. No. 3,735,753 and is shown in FIG. 1. It includes a hinged frame 11 that is large enough to encircle the patient's head and is approximately oval to conform to the shape of the head. Soft pads 12 are attached to the inner surface of the frame 11 so that the frame will not press uncomfortably against the patient, and a strap 13 permits the hinged frame 11 to be adjusted to a variety of sizes. Five electrodes 14 are resiliently supported by the frame 11 so that they can be placed in the correct positions on the patient's head according to standard EEG techniques. Two of the electrodes 14 are located to be energized by electrical signals from the frontal part of the patient's brain, one on the left side and one on the right. Two other electrodes 14 are located over left and right occipital areas, and the fifth electrode 14 is placed where it can serve as a ground connection to the patient.

Figure 3:
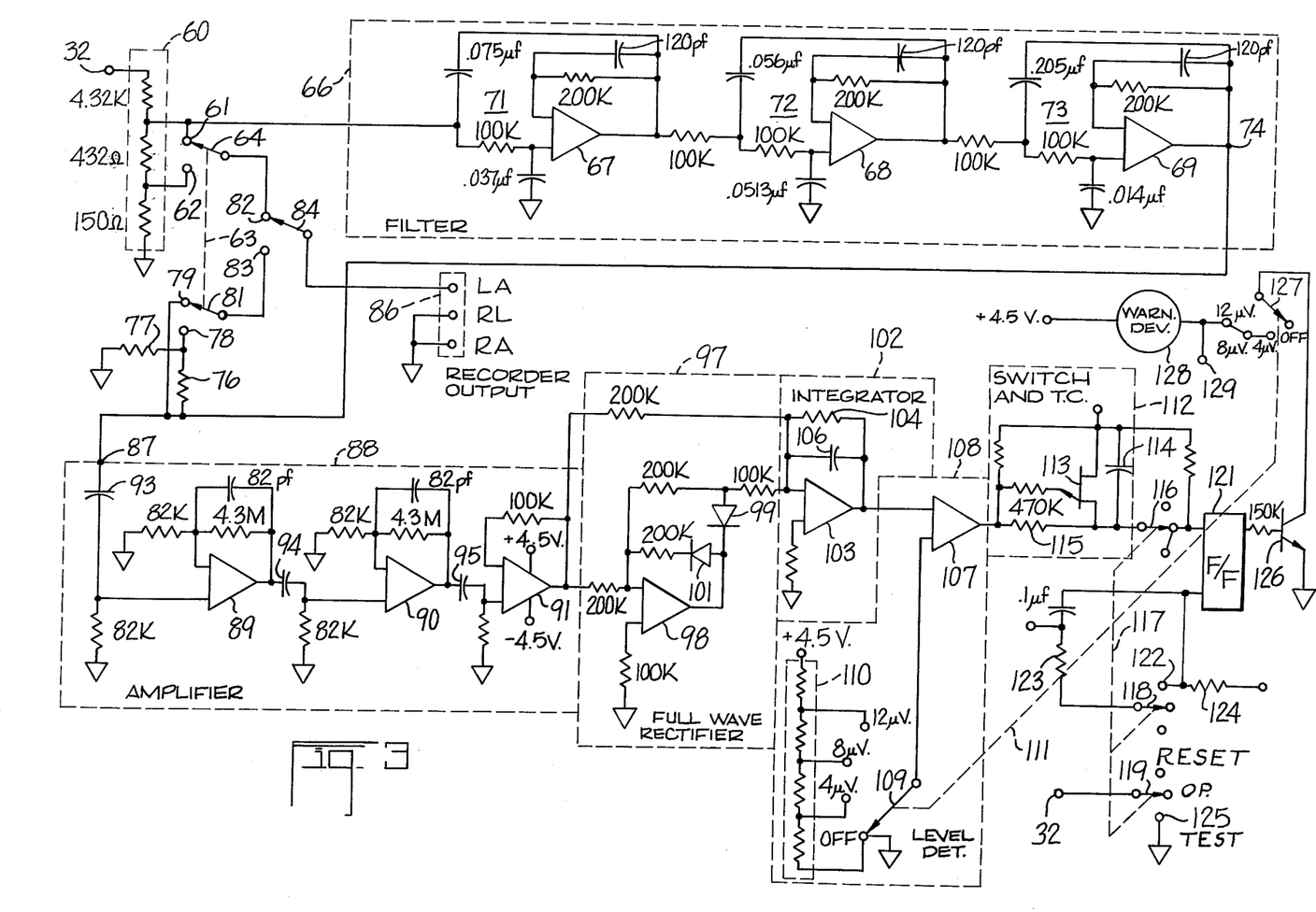
Figure 4:
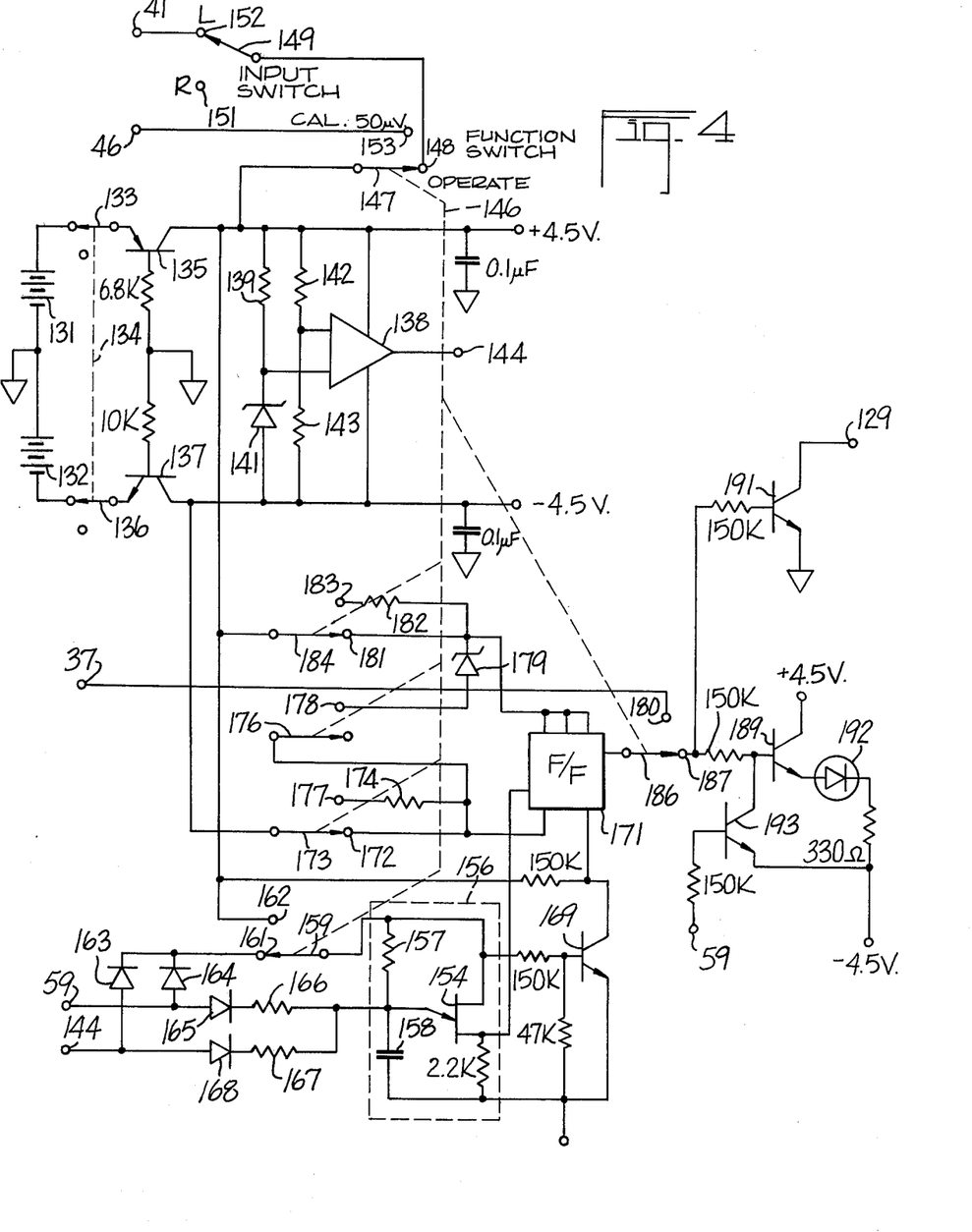

The circuit of this invention is shown in FIGS. 2–4. FIG. 2 shows an input section 16 of the circuit. This section may be located in a small box close to the patient and at some distance from the rest of the circuit. The input section includes five input terminals 17–21 connected to the proper ones of the electrodes 14 so that the terminals 17 and 18 receive occipital and frontal electrical signals, respectively, from the left side of the patient's brain and the terminals 19 and 20 receive occipital and frontal signals, respectively, from the right side. The terminal 21 is connected to the grounding electrode.

The input terminals 16–21 are connected to a switching network in the form of an integrated circuit (IC) 23. The IC 23 includes four switching circuits 24–27, connected, respectively, to the terminals 17–20. The switching circuits 24–27 are bilateral in operation, which means that signals can flow through them in either direction, but to simplify the description of this section 16 of the apparatus, it will be assumed that each switching circuit has an input terminal, an output terminal, and an actuating terminal. With this in mind, the terminals of the switching circuits 24–27 that are connected to the terminals 17–20 will be referred to as the input terminals. The output terminals of the switching circuits 24 and 26 are connected together to one input terminal of an instrument pre-amplifier 28. The pre-amplifier 28 is constructed as a differential amplifier IC, and it has a second input terminal connected to the output terminals of the circuits 25 and 27. A resistor 29 is connected in series between two other terminals of the pre-amplifier 28 to set the gain of the pre-amplifier at about 500, and a variable resistor 31 connected to the pre-amplifier can be adjusted to a value that will produce maximum common mode rejection. The pre-amplifier 28 has an output terminal 32.

Another IC switching network 33 controls the operation of the IC switching network 23. The network 33 includes three switching circuits 34–36. The input terminal of the switching circuit 34 is connected to the output terminals of the switching circuits 25 and 27, and the output terminal of the switching circuit 34 is connected to ground. The input terminal of the switching circuit 35 is connected to the common circuit point of a voltage divider which, in turn, is connected between a switching signal input terminal 37 and ground. The voltage divider comprises a pair of resistors 38 and 39 of which the resistor 39 has a much lower resistance than the resistor 38. The output terminal of the switching circuit 35 is connected to the same input terminal of the pre-amplifier 28 as the output terminals of the switching circuits 24 and 26. The input terminal of the third switching circuit 36 in the IC 33 is connected to the actuating terminals of the switching circuits 26 and 27, and the output terminal of the switching circuit 36 is connected to ground.

An actuating signal input terminal 41 is connected to the actuating terminals of the switching circuits 24 and 25 and, via a diode 42, to the actuating terminal of the switching circuit 36. The actuating terminals of the switching circuits 24 and 25 are also connected to ground by a resistor 43. The actuating terminals of the switching circuits 26 and 27 are connected by way of a resistor 44 to a positive 4.5 volt power supply terminal. Another actuating signal input terminal 46 is directly connected to the actuating terminals of the switching circuits 34 and 35, and, via a diode 47, to the actuating terminal of the switching circuit 36.

Although the input section 16 is not used by itself, its operation will be explained at this point to facilitate a better understanding of the complete apparatus. The switching circuits 24–27 are electrically equivalent to four single-pole switches but their actuating terminals are connected together in pairs so that either the switching circuits 24 and 25 are made conductive simultaneously to apply the left occipital and the left frontal signals to the differential input terminals of the pre-amplifier 28, or the switching circuits 26 and 27 are made conductive simultaneously to apply the right occipital and right frontal signals to the pre-amplifier 28. Thus, the attendant has the choice of monitoring EEG signals from either the left or right side of the patient's brain. All of the switching circuits 24–27 and 34–36 are made conductive by applying a suitable actuating signal in the form of a positive voltage, such as 4.5 volts, to their actuating terminals. If an actuating signal of this type is applied to the terminal 41, the switching circuits 24 and 25 are made conductive. The same actuating signal is of the proper polarity to make the diode 42 conductive, so that the actuating signal is also applied to the actuating terminal of the switching circuit 36. As a result, the switching circuit 36 becomes conductive and short-circuits the actuating terminals of the switching circuits 26 and 27 to ground. This holds both of the switching circuits 26 and 27 in a non-conductive state so that signals from the right side of the patient's brain are prevented from reaching the pre-amplifier 28. The diode 47 is non-conductive with respect to positive actuating signals applied to the terminal 41 and so the switching circuits 34 and 35 are not actuated but remain non-conductive.

On the other hand, if the EEG signals from the right side of the patient's brain are to be monitored the actuating signal is simply not applied to the terminal 41. No other actuating signal need be applied. This is due to the fact that the actuating terminals of the switching circuits 26 and 27 are connected through the resistor 44 to the positive 4.5 volt power supply. The current required to actuate any of the switching circuits is quite small, and so the voltage drop across the resistor 44 does not reduce the voltage applied to the actuating terminals of the switching circuits 26 and 27 appreciably or, at least, not enough to prevent these switching circuits from being made conductive. Since the actuating signal is no longer applied to the terminal 41, the switching circuit is not conductive and does not short-circuit the actuating terminals of the switching circuits 26 and 27.

When EEG signals from either the left or the right side of the patient's brain are to be monitored, they are applied differentially to the pre-amplifier 28. One of the important reasons for using a differential amplifier for the pre-amplifier 28 is that it allows stray noise signals to be balanced out. Noise signals, such as radiation from local power lines, usually at 60Hz in the United States, would affect equally the signals applied to both input terminals of the pre-amplifier 28, and a signal applied equally to the two input terminals is said to be applied in the common mode. By balancing the operation of the pre-amplifier by means of the resistor 31, common mode signals are rejected, and the only signal transmitted to the output terminal 32 is an amplified replica of the signal that represents the difference between the signals applied to the two input terminals of the pre-amplifier.

When the instrument of which the section 16 is only a part is placed in use, the circuits should be calibrated. The circuits may also be calibrated at other times, if desired. This is done by applying a calibrating signal of known amplitude to one of the input terminals of the pre-amplifier 28 and simultaneously short-circuiting the other input terminal to ground. Such a calibration signal is generated in the main part of the apparatus and is connected to the calibration signal input terminal 37, where it is attenuated by the voltage divider comprising the resistors 38 and 39. This attenuation means that a relatively high voltage, which may, in fact, be only a few volts in magnitude, can be carried by a connecting wire from the main part of the apparatus to the terminal 37, and if any noise signals are picked up, they will, in the first place, be of small amplitude relative to the calibration signal and will, in the second place, be attenuated along with the calibration signal by the voltage divider.

The switching circuits 34 and 35 are simultaneously made conductive by an actuating signal, for example a positive 4.5 volt signal, applied to the terminal 46. Making the switching circuit 34 conductive short-circuits the output terminals of the switching circuits 25 and 27 and the corresponding input terminal of the pre-amplifier 28 to ground. Making the switching circuit 35 conductive allows the attenuated calibration signal of known amplitude to be applied to the other input terminal of the pre-amplifier. The output signal of the pre-amplifier 28 may be measured at the output terminal 32 or, as is more likely, at a point further along the signal path to be described hereinafter.

The actuating signal applied to the terminal 46 also is of the proper polarity to make the diode 47 conductive and thus to reach the actuating terminal of the switching circuit 36, and to make that switching circuit conductive. The diode 42 prevents an actuating signal applied to the terminal 46 from reaching the actuating terminals of the switching circuits 24 and 25, just as the diode 47 prevents an actuating signal applied to the terminal 41 from reaching the actuating terminals of the switching circuits 34 and 35. When the switching circuit 36 is made conductive by an actuating signal from the terminal 46, it short-circuits the actuating terminals of the switching circuits 26 and 27 to ground. As a result, any signals applied to the terminal 19 during the calibration time would not reach the pre-amplifier 28 and would not interfere with the calibration signals. The output terminal of the switching circuit 27 is already short-circuited to ground through the switching circuit 34 and so could not transmit interfering signals to the pre-amplifier 28, anyway.

FIG. 2 also shows a second section 48 of the complete circuit. The section 48 is preferably located at the same place as the main part of the complete circuit and is responsive to the local power signal frequency and amplifies any signal of that frequency that is present at the output terminal 32. Such a signal would be present if one of the electrodes 14 in FIG. 1 became disconnected, and the section 48 would then provide a signal to actuate a warning device to alert an attendant of such malfunction of the apparatus. It is for this reason that the section 48 may be designated as the loose electrode detection circuit.

The section 48 includes an input operational amplifier (op-amp) 49 having an input terminal connected to the output terminal 32. A resistor 51 controls the gain of the op-amp 49 to a suitable value, such as 20 times. The output terminal of the op-amp 49 is connected to a second op-amp 52 that has a gain of about 50 times. A bridged-T circuit 53 is connected to the op-amp 52 as a feedback network and is tuned to the local power line frequency, which in this case is 60 Hz. The output terminal of the op-amp 52 is connected to a rectifier 54 and a smoothing circuit 56, and the rectifier 54 is connected to another op-amp 57. The latter is a differential amplifier the operating level of which is determined by a voltage divider 58. The op-amp 57 has an output terminal 59.

Operation of the section 48 is controlled by the resistor 51, which determines the sensitivity of this part of the apparatus, by the bridged-T circuit 53, which allows feedback of other frequencies except the power line frequency, and by the voltage divider 58. If an electrode 14 that is supposed to be supplying signal to the pre-amplifier 28 becomes displaced, it picks up any signals that energize it, much in the manner of an antenna. The strongest ambient, steady signal is at the power line frequency. This signal is amplified by the op-amps 49 and 52 and is rectified by the rectifier 54. The rectified signal is filtered by the smoothing circuit to produce, essentially, a direct voltage. If the magnitude of the direct voltage across the smoothing circuit 56 exceeds the voltage at the common circuit.

FIG. 3 shows the main part of the circuit for handling a signal from the input section 16. Although the input section 16 may be separated some distance from the part of the circuit shown in FIG. 3 and may be connected to it by a cable, the complete circuit may be assembled in a single location, and so the signal input terminal of the circuit section in FIG. 3 is indicated by the same reference numeral 32 as the output terminal of the input section 16 in FIG. 2. The terminal 32 is connected to one end of a voltage divider 60 that has two intermediate points connected to contacts 61 and 62 of one pole of a double-pole, double-throw switch 63, which is referred to as a sensitivity switch. An arm 64 can be actuated by an attendant to engage either the contact 61 or the contact 62.

The contact 61 is also connected to the input terminal of a filter circuit 66. This filter circuit includes three op-amp stages 67–69, each of which has unity gain. The filter 66 is a stagger-tuned filter having substantially flat pass band from approximately 4 Hz to 24 Hz and 3db points at approximately 1.7Hz and 30Hz. The pass band is achieved by stagger-tuning the three stages of the filter. The first stage comprising the op-amp 67 is tuned by a resistance-capacitance element 71, the second stage comprising the op-amp 68 is tuned by resistance-capacitance element 72, and the third stage comprising the op-amp 69 is tuned by resistance-capacitance element 73. As is shown in FIG. 3, the capacitors in the resistance-capacitance networks 71–73 are all different in accordance with the different center frequencies to which each of the stages of the filter 66 is tuned.

The third stage op-amp 69 has an output terminal 74 that forms the output terminal for the filter 66 and is connected to one end of a voltage divider that comprises a pair of resistors 76 and 77 and to one of the contacts 78 of the second pole of the double-pole, double-throw switch 63. The common circuit point between these resistors is connected to the other contact 79 of the second pole of the switch 63. The arm of this pole of the switch 63 is indicated by reference numeral 81. A single-pole, double-throw switch, referred to as a filter switch, has two contacts 82 and 83 connected, respectively, to the arms 64 and 81 of the switch 63. The contacts 82 and 83 are engaged by an arm 84 that is connected to a recorder output connector 86.

The output terminal 74 of the filter 66 is also connected to an input terminal 87 of a three stage amplifier 88. This amplifier comprises two op-amp stages 89 and 90, each of which has a gain of approximately 52 times, and a third op-amp 91 that has unity gain and provides the proper output impedance for connection to further circuit components. The input terminal 87 of the amplifier 88 is connected through a capacitor 93 to the input terminal of the first op-amp stage 89. The first stage is connected to the second stage by a capacitor 94, and the second stage is connected to the third stage by a capacitor 95.

The signal from the third stage op-amp 91 of the amplifier 88 is applied to a full wave rectifier 97 that includes an op-amp 98 and two diodes 99 and 101. The rectifier circuit 97, in turn, supplies its rectified output signal to an integrator circuit 102 that comprises an op-amp 103 and a resistance-capacitance feedback circuit consisting of a resistor 104 in parallel with a capacitor 106.

The output terminal of the integrator circuit 102 is connected to an input terminal of an op-amp 107 in a level detector circuit 108. The op-amp 107 is a differential amplifier that has a second input terminal connected to an arm 109 of a switch 111. This switch has several contact positions to which the arm 109 can be moved and these positions are connected to different points along a voltage divider 110.

The output terminal of the op-amp 107 in the level detector 108 is connected to an input terminal of a switch and timing circuit 112, that comprises a field effect transistor (FET) 113 as the switch and a capacitor 114 and a resistor 115 as the timing circuit.

The output of the switch and timing circuit 112 is connected to an arm 116 of a switch 117. The arm 116 and two other arms 118 and 119 are capable of moving to three different positions that correspond to three modes of operation. The normal operating mode position of the switch 117 is indicated "OP." adjacent the arm 116, and the two other mode positions are indicated "TEST" and "RESET." In the normal operating position and in the test position, the arm 116 of the switch 117 is connected to a level detector at the triggering input terminal of a flip-flop 121. When the mode switch 117 is placed in the position to reset the flip-flop 121, the arm 118 engages a contact 122, which then becomes the common terminal of a voltage divider comprising two resistors 123 and 124 connected between a positive 4.5 volt power supply terminal and a negative 4.5 volt power supply terminal. The arm 119 of the switch 117 is connected to the input terminal 32, which is the same terminal as in the upper left-hand corner of FIG. 3. When the switch 117 is in the testing position, the arm 119 engages a grounded contact 125.

The output terminal of the flip-flop 121 is connected to the base of a transistor 126, and the emitter-collector circuit of this transistor is connected in series between ground and an arm 127 of the switch 111. The arm 127 is shown engaging a contact marked "OFF," which is not connected to any other part of the circuit. The other three terminals to which the arm 127 may be connected are all short-circuited together to a warning device 128. The warning device 128 may also be connected to another part of the circuit, which will be described hereinafter, by means of a terminal 129.

In the operation of the circuit in FIG. 3, the input signal at the terminal 32 is attenuated by the voltage divider 60 and is applied to the filter 66. Each of the stages 67–69 of the filter 66 has unity gain so that the output signal at the terminal has the same voltage level as the input signal.

If desired, the EEG signal applied to the filter 66 or the output signal from the filter may be connected to a recorder by setting the arm 84 to engage the contact 82 or the contact 83, respectively. If the arm 84 engages the contact 82, the unfiltered EEG signal is made available at the recorder-connector 86. This signal may be made available at either of two sensitivity settings according to the position of the arm 64 of the sensitivity switch 63. If the arm 64 engages the contact 61, the EEG signal transmitted to the recorder-connector 86 is at 2 $\mu$V/mm. If the arm 64 engages the contact 62, the signal transmitted to the recorder-connector 86 is at a level of 7.5 $\mu$V/mm. If the filtered signal is to be transmitted to the recorder-connector 86, the switch 63 may be actuated so that the arm 81 engages either the contact 78 or the contact 79, and the arm 84 of the other switch must be set to engage the contact 83.

The purpose of making these signals available to be recorded is that it is sometimes desirable to obtain a permanent record of the EEG signals from the patient, and the present circuit makes it possible to obtain such signals for recording without the necessity of connecting a standard EEG device to the patient.

However, the primary purpose of the present circuit is to give a warning of the patient's declining cerebral activity, particularly as that activity decreases below certain selected levels. For that purpose, the output signal of the filter 66 is always connected to the amplifier 88. This amplifier is AC coupled for the purpose of avoiding extraneous signals that would interfere with operation of the warning device 128. Such extraneous signals, known as artifacts, may be due, for example, to eye movement of the patient, which would produce a signal of very low frequency, but of such amplitude as to cause possible interference with the warning device 128.

The output signals from the amplifier 88 are rectified by the full wave rectifier 97 to provide a signal composed of a succession of pulses having one polarity. These pulses are not necessarily all of the same amplitude and are not equally spaced apart in time. The integrator circuit 102 has an output signal that approaches a predetermined value at a rate determined by the time constant of the resistor 104 and the capacitor 106. A suitable time constant has been found to be approximately one second. As output pulses from the rectifier 97 are applied to the integrator circuit 102, they cause the output voltage of the integrator to shift away from the predetermined value. However, as the pulses from the rectifier 97 diminish in amplitude or become spaced farther and farther apart, the output voltage of the integrator 102 approaches closer to the predetermined value.

The level detector 108 is arranged so that, as long as the output voltage of the integrator circuit 102 does not reach the predetermined value, there will be no output voltage from the op-amp 107. The value of the predetermined voltage at which the op-amp 107 will produce an output signal is set by the arm 109 of the switch 111. As is indicated in the drawing, the setting may be any one of three values indicated as 4 microvolts, 8 microvolts, and 12 microvolts. These amplitudes refer to the peak-to-peak voltage levels at the input of the pre-amplifier 28 in FIG. 2.

The FET 113 in the switch and timing circuit 112 is normally conductive as long as there is no output signal from the op-amp 107 in the level detector 108. However, when the pulses from the rectifier circuit 97 cease or diminish in amplitude or in repetition rate sufficiently, the output voltage of the integrator circuit 102 drops to a level that allows the level detector 108 to produce an output signal which biases the FET 113 so that it becomes non-conductive. The capacitor 114 then charges relatively slowly through the resistor 115 until the voltage at the switch arm 116 reaches the triggering level of the flip-flop 121. The time constant of the capacitor 114 and the resistor 115 is so long that it takes approximately 5 seconds from the time of the last pulse from the full wave rectifier 97 until the flip-flop 121 is set. If there is any cerebral activity during that 5 second interval, the output voltage of the op-amp 107 drops and causes the FET 113 to become conductive, thereby discharging completely the partially charged capacitor 114. Since the voltage across the capacitor 114 always starts from the same completely discharged level, the time required for the flip-flop 121 to reach its setting condition is virtually constant. When the flip-flop 121 is set, the transistor 126 is biased to become conductive and, if the arm 127 of the switch 111 engages one of the three terminals connected to the warning device 128, the warning device will be activated.

One of the advantages of having the voltage across the capacitor 114 always start at the same value is that it provides a uniform delay between the last cerebral signal and the time the warning device 128 is activated. The length of time selected, namely about 5 seconds, is such that it is extremely unlikely that a patient whose cerebral activity had decreased to that point could recover. However, further measurements may be made by setting the sensitivity switch 63 at its most sensitive level, which is indicated as 4 microvolts. That is the voltage required to be applied to the input terminal of the pre-amplifier 28 in FIG. 2 in order to prevent the op-amp 107 from causing the FET 113 to be turned off. If there is still no measurable signal even at the most sensitive setting of the circuit, the patient may be considered electrocerebrally silent, and additional procedures may be instituted to define the need to terminate further attempts at revival.

Once the flip-flop 121 has been set, it will remain set until a resetting voltage is applied. The warning device 128 can be turned off by turning the control knob of the switch 111 to place the arm 127 in the "OFF" position but the monitor is then out of service until the arm 127 is moved to one of the other three positions. When that happens, the warning device 128 will again be activated because the flip-flop 121 is still in its set condition. The warning device can only be deactivated to get it ready for further use by placing the mode switch 117 in its reset position. In that position, the arm 118 engages the contact 122 and shortly thereafter, a resetting voltage will be applied to the resetting terminal of the flip-flop.

FIG. 4 shows the power supply and calibration circuit section of the complete circuit. The power supply includes two batteries 131 and 132 connected in series and with the common circuit point between them connected to ground. The positive terminal of the battery 131 is connected by one arm 113 of a double-pole, single-throw switch 134, which is the main power switch, to the emitter of a PNP transistor 135. Similarly, the negative terminal of the battery 132 is connected by way of a switch 136, which constitutes the other pole of the double-pole, single-throw main power switch 134, to the emitter of an NPN transistor 137. The collector of the transistor 135 is the positive terminal of the power supply for the circuit and the collector of the transistor 137 is the negative terminal. These transistors are included in the circuit to prevent any damage if the batteries 131 and 132 are inadvertently connected in the reverse polarity. If that happens, the transistors 135 and 137 will simply be biased to be nonconductive and thus prevent injury to any of the amplifiers in the circuit.

The power supply also includes a differential op-amp 138, one input terminal of which is connected to the common circuit point between a resistor 139 and a zener diode 141. The other input terminal of the differential op-amp 138 is connected to the common circuit point of a voltage divider comprising two resistors 142 and 143. The resistors 139 and 142 are connected to the positive terminal of the power supply and the zener diode 141 and the resistor 143 are connected to the negative terminal. The output terminal of the op-amp 138 is indicated by reference numeral 144.

The differential op-amp 138 serves as a level detector circuit to measure the voltage of the batteries 131 and 132. When the total voltage between the collectors of the transistors 135 and 137 drops below about 7.2 volts, the output voltage at the terminal 144 rises to a positive value and supplies a warning signal in a manner to be described hereinafter. Alternatively, separate level detectors can be connected to the batteries 131 and 132.

The circuit in FIG. 4 also includes a function switch 146, which consists of a plurality of arms capable of being moved to either of two positions corresponding to two functions of the complete circuit. The first position is the operating position in which the monitoring apparatus carries out its normal operating function. The second position is the calibration position in which the circuits, particularly the input section 16 shown in FIG. 2, are calibrated. The settings of the switch 146 for these functions is indicated in the drawing adjacent to arm 147 connected to the positive power supply terminal at the collector of the transistor 135. The arm 147 is shown engaging the normal operating contact 148 which, in turn, is connected to the arm of a switch 149 identified as the input switch. The input switch 149 is indicated as a single-pole, single-throw switch. It is shown with a first contact 151 that is not connected to any other part of the circuit and a second contact 152 connected to a terminal 41. This is the same terminal 41 as is shown in the circuit section 16 in FIG. 2. The other contact to be engaged by the switch arm 147 in the calibration position is identified by reference numeral 153 and is connected to the terminal 46, which corresponds to the terminal that has the same reference number in the circuit section 16 in FIG. 2.

As described in connection with the circuit section 16 of the circuit in FIG. 2, when a suitable positive voltage is applied to the terminal 41, as is the case with the arm 147 of the switch 146 and the arm 149 of the input switch in the positions illustrated in FIG. 4, the preamplifier 28 receives signals from the left side of the patient's brain. On the other hand, when this voltage is removed from the terminal 41, as it would be if the input switch 149 were placed in its alternative position with the arm in contact with the terminal 151, the preamplifier in FIG. 2 receives signals from the right side of the patient's brain.

The calibration section of the circuit in FIG. 4 includes a unijunction transistor 154 connected in a pulse generating circuit 156. The repetition rate of pulses generated by the circuit 156 is determined by a resistor 157 and a capacitor 158. The circuit 156 is a standard form of unijunction transistor pulse circuit. The base-one electrode of the transistor 154 is connected to a negative 4.5 power supply terminal and the base-two electrode is connected to an arm 159 of the function switch 146. This arm can engage either of two contacts 161 and 162. The contact 162 is connected to the positive power supply terminal and is engaged by the arm 159 in the calibration position. The contact 161 is engaged by the arm 159 in the operating position and is connected to two diodes 163 and 164. The diode 163 is connected to the terminal 144, which is also the output terminal of the differential amplifier 138, but the actual wiring between the two locations of the terminal 144 is not shown in order to simplify the diagram in accordance with standard wiring diagram practice. The diode 164 is connected to the terminal 59, which is also indicated in FIG. 2 as the output terminal of the op-amp 57 that is energized if an electrode 14 becomes disengaged from the patient. The terminal 59 in FIG. 4 is also connected through a diode 165 and a resistor 166 to the gate of the unijunction transistor 154. The terminal 144 is connected through a diode 168 and a resistor 167 of higher resistance than the resistor 166 to the gate of the unijunction transistor 154.

The arm 159 of the function switch 146 is also connected to the base of a transistor 169, the emitter of which is connected to the negative power supply terminal and the collector of which is connected to a terminal of a flip-flop 171. The collector of the transistor 169 is also connected through a load resistor to the positive power supply terminal.

The flip-flop 171 has a gating signal input terminal connected to the base-one electrode of the unijunction transistor 154. The flip-flop 171 has two other terminals that are normally connected to a negative power supply terminal. One of these terminals is connected to a contact 172 to be engaged by an arm 173 of the function switch 146 in the operating position and to one end of a resistor 174 and to another arm 176 of the function switch. The other end of the resistor 174 is connected to a contact 177, which is also located where it can be engaged by the arm 173 in the calibration position. The switch arm 176 engages a contact 178 in the calibration position and this contact is connected to the anode of a zener diode 179. The cathode of the zener diode is connected to those terminals of the flip-flop 171 that are normally to be connected to a positive power supply terminal. In addition, the anode of the zener diode is connected to a contact 181 of the function switch 146 and to one end of a resistor 182. The other end of the resistor 182 is connected to another contact 183 of the function switch, and an arm 184 engages the contact 181 in the normal position and the contact 183 in the calibration position. The arm 184 is connected to the positive power supply terminal.

The output terminal of the flip-flop 171 is connected to an arm 186 of the function switch 146. This arm engages either a contact 187 in the normal operation position or a contact 180 in the calibration position. The contact 180 is connected to the terminal 37 which, as was described in connection with the section 16 of the circuit in FIG. 2, is the terminal by which a calibration signal is applied to that section of the circuit.

The contact 187 is connected to the bases of two transistors 189 and 191. The transistor 189 is connected as an emitter follower, and its load includes a light-emitting diode 192. The emitter-collector circuit of a transistor 193 is connected across the input circuit of the transistor 189 between the base of the latter transistor and the negative power supply terminal to which the emitter load is connected. The base of the transistor 193 is connected to the terminal 59 which is also the output terminal of the op-amp 57 which is shown in FIG. 2 and is energized when one of the electrodes 14 in FIG. 1 becomes disengaged from the patient. The collector of the transistor 191 is connected to the terminal 129 shown in FIG. 3 as being connected directly to the warning device 128.

The operation of the circuit in FIG. 4 will be described in conjunction with the related elements in FIGS. 2 and 3.

When the switch 146 in FIG. 4 is placed in its calibration position, the arm 159 engages the contact 162 and supplies operating voltage to the pulse generator 156. This is a free-running circuit that supplies pulses to the gating signal input terminal of the flip-flop 171 at a pulse repetition rate determined by the resistance of the resistor 157 and the capacitance of the capacitor 158. Placing the arm 159 so that it engages the contact 162 also supplies a bias signal to the transistor 169 to make it conductive so that its collector terminal, which is connected to one of the negative power supply terminals of the flip-flop 171, is effectively short-circuited to the negative power supply terminal. The other negative power supply terminal of the flip-flop 171 is connected through the arm 176 and the contact 178 directly to the anode of the zener diode 179 and, through the resistor 174, the contact 177, and the arm 173, to the negative power supply terminal. The positive voltage terminals of the flip-flop 171 are connected to the cathode of the zener diode 179 and, through the resistor 182, the contact 183, and the arm 184, to the positive power supply terminal. The resistors 174 and 182 and the zener diode 179 form a voltage divider between the positive and negative terminals of the power supply. Since the flip-flop 171 is connected directly across the zener diode 179 in the calibration operation of the circuit, the signals generated by the flip-flop circuit and applied by way of the arm 186 and the contact 180 to the terminal 37 are of fixed, predetermined amplitude.

Setting the switch 146 in its calibration position brings the arm 147 into engagement with the contact 153 and applies a positive power supply voltage to the terminal 46 while removing it from the terminal 41. As discussed previously, removing the positive voltage from the same terminal 41 in FIG. 2 causes the switching circuits 24 and 25 to be non-conductive. Applying a positive power supply voltage to the terminal 46 in FIG. 2 causes all three of the switching circuits 34–36 to be conductive. The conductive switching circuit 36 short-circuits the actuating terminal of the switching circuits 26 and 27 to ground so that all four of these switching circuits 24–27 are non-conductive and no signals can pass through from the input terminals 17–20.

The signal applied to the terminal 37 in FIGs. 2 and 4 is the output square wave pulse signal of the flip-flop 171 as the latter is toggled back and forth by the pulse signals from the generator 156. Since the output signal of the flip-flop 171 has a fixed amplitude determined by the zener diode 179, the attenuated fraction of this signal applied through the switching circuit 35 in FIG. 2 to the input terminal of the pre-amplifier 28 also has a fixed amplitude that is a small fraction of the amplitude at the terminal 37. The operation of the pre-amplifier 28 in FIG. 2 and the sensitivity control 60 in FIG. 3 can be checked at the recorder output by the calibration signal. When the switch 117, in FIG. 3, is in the test position, a zero signal is applied to the amplifier 66 input, thereby verifying that the remainder of the circuitry, including the level detector 108, is operational.

After the calibration of the circuit has been checked, the switch 146 in FIG. 4 is returned to the operating position. In this position, the arms 184 and 173 connect the flip-flop 171 directly in series between the positive and negative terminals of the power supply. Thus, the output pulse signal of the flip-flop would have a higher amplitude than the amplitude of the calibration pulse signal.

The transistor 169 is normally non-conductive in the operating position of the switch 146, and this prevents an output signal from being derived from the flip-flop 171 and applied to the arm 186 of the switch. Thus, there is no signal to actuate either the transistors 189 or 191, which means that the light-emitting diode 192 connected in the emitter circuit of the transistor 189 is not actuated, and the warning device 128 in FIG. 3 is not actuated by way of the terminal 129 in FIGS. 3 and 4 and the transistor 191 in FIG. 4.

If an electrode 14 in FIG. 1 becomes dislodged from the patient's head, it will pick up signals in the vicinity. Such signals will always include radiation from the power supply lines of the local alternating current supply. This signal is passed through whichever set of the switching circuits 24–27 is operative, is amplified by the pre-amplifier 28 as previously described, and is applied to the circuit 48 where it produces an output signal at the terminal 59. The output signal at the terminal 59 in FIG. 2, which is also shown in the lower left-hand corner of FIG. 4, is a positive signal that activates the pulse generator 156 by way of the diodes 164 and 165. However, the resistor 166 modifies the pulse repetition frequency of the generator 156 and thus changes the rate at which the flip-flop 171 is toggled back and forth. The signal applied through the diode 164 also biases the base of the transistor 169 to be conductive so that the output circuit of the flip-flop 171 can be derived and passed through the arm 186 and the contact 187 to the base of the transistor 191 to make the transistor intermittently conductive as the output signal of the flip-flop toggles back and forth. As a result, the warning device 128 in FIG. 3 also is energized intermittently by virtue of the signal applied to it through the terminal 129 and thus provides a pulsating warning signal in contrast to the steady warning signal produced due to failure of the patient to generate cerebral signals, as was discussed in connection with the operation of the circuit in FIG. 3.

The pulsating signal at the switch contact 187 is also applied to the base of the transistor 189, but the steady signal from the terminal 59 applied to the base of the transistor 193 causes the latter transistor to be conductive, thus short-circuiting the pulsating signal applied to the base of the transistor 189 and preventing the light-emitting diode 192 from being actuated.

The third condition that must be monitored is the condition of the batteries 131 and 132. If they become too weak, the remainder of the circuit will not operate and there will be no warning of cessation of cerebral activity by the patient. As described hereinabove, the differential op-amp 138 produces an output signal at the terminal 144 if the voltage of the batteries as measured across the voltage divider 142 and 143 falls below 7.2 volts. If this happens, a positive voltage is applied by way of the terminal 144 connected to the differential op-amp 138 to the terminal 144 in the lower left-hand corner of the drawing in FIG. 4. This positive voltage supplies operating potential for the pulse generator 156 by way of the diode 163. The positive voltage from the terminal 144 is also supplied by way of the diode 168 to the resistor 167, which is effectively in parallel with the resistor 157, and modifies the frequency of pulses produced by the generator 156 to a value that is different from the value during calibration and different from the value caused by a loose electrode. The transistor 169 is biased to the conductive state by way of the positive signal through the diode 163. Thus, the flip-flop 171 is able to produce a pulsating signal with a different repetition rate. This signal is supplied to the arm 186 of the switch 146 and, through the switch arm and the contact 187, to the bases of the transistors 189 and 191. The transistor 193 is not conductive and so the pulsating signal applied to the transistor 189 causes the light-emitting diode 192 to produce light to indicate that the battery voltage is lower than it should be. The pulsating signal applied to the transistor 191 also causes the warning device 128 in FIG. 3 to produce a pulsating warning but at a frequency that indicates that the batteries 131 and 132 need to be replaced.

Typical circuit parameter values have been indicated in the circuits in FIGS. 2–4. In addition to the values shown, an operating embodiment of the circuit has been produced utilizing the following values:

| Ref. No. | Value or Type | Ref. No. | Value or Type |
|---|---|---|---|
| 23 | CD 4016A | 39 | 5 ohms |
| 28 | FMI 9477 | 42 | 1N 456A |
| 29 | 75K | 43 | 100K |
| 31 | 1K | 44 | 100K |
| 33 | CD 4016A | 47 | 1N 456A |
| 38 | 471K | 49 | MC 1741 CP |
| 52 | MC 1741 CP | 123 | 1K |
| 54 | 1N 456A | 124 | 200K |
| 57 | MC 1741 CP | 126 | 2N 2714 |
| 67 | MC 1741 CP | 128 | Mallory Sonalert S6628 |
| 68 | MC 1741 CP | 135 | 2N 3638 |
| 69 | MC 1741 CP | 137 | 2N 2714 |
| 76 | 7.5K | 138 | MC 1741 CP |
| 77 | 3.01K | 139 | 47K |
| 89 | MC 1741 CP | 141 | 1N 5847B |
| 90 | MC 1741 CP | 142 | 100K |
| 91 | 5556V | 143 | 221K |
| 93 | 2μf | 154 | 2N 2646 |
| 94 | 2μf | 157 | 150K |
| 95 | 2μf | 158 | 10μf |
| 98 | 5556V | 163 | 1N 456A |
| 99 | 1N 456A | 164 | 1N 456A |
| 101 | 1N 456A | 165 | 1N 456A |
| 103 | 5556V | 166 | 30K |
| 104 | 200K | 167 | 100K |
| 106 | 4.7μf | 168 | 1N 456A |
| 107 | 5556V | 169 | 2N 2714 |
| 113 | P1087E | 171 | CD 4027 AE |
| 114 | 27 f | 174 | 1K |
| 115 | 91K | 179 | L VA 47A |
| 121 | CD 4027 AE | 182 | 1K |
| 189 | 2N 2714 | 192 | RL-2 |
| 191 | 2N 2714 | 193 | 2N 2714 |

While this invention has been described in terms of a specific embodiment of a cerebral activity monitor, it will be apparent to those skilled in the art that modifications may be made therein without departing from the true scope of the invention as defined by the following claims.

What is claimed is:

1. A cerebral activity monitor comprising:
   A. means to derive electroencephalographic signals from a patient;
   B. rectifier means connected to receive selected ones of said signals and to transform the selected signals into a unipotential signal of varying magnitude impulses;
   C. integrator means connected to said rectifier means to generate a voltage that tends to change in one direction between successive ones of said impulses and tends to return to an initial value at the occurrence of each of said impulses that has at least a certain magnitude;
   D. a level detector circuit connected to said integrator means to be actuated when said output signal of said integrator changes in said one direction beyond a predetermined level, said level detector circuit returning to a predetermined output voltage value each time said voltage returns to said initial value;
   E. a switching circuit connected to said level detector to be actuated by the output signal from said level detector and comprising a time constant circuit to start a change of charge level from the same predetermined initial level each time said switching circuit is actuated; and
   F. warning means connected to said time constant circuit to be actuated when the charge level of said time constant circuit reaches a predetermined actuating value.

2. The cerebral activity monitor of claim 1 in which said integrator means comprises a second time constant circuit of substantially lower time constant value than said first-named time constant circuit.

3. The cerebral activity monitor of claim 2 in which said time constant value of said first-named time constant is approximately 25 times as high as said time constant value of said second time constant circuit.

4. The cerebral activity monitor of claim 2 in which said level detector comprises level determining means to cause said level detector circuit to be actuated approximately 1 second after the last one of said selected signals.

5. The cerebral activity monitor of claim 4 in which said first-named time constant circuit allows said warning means to be actuated approximately 5 seconds after the last one of said selected signals.

6. The cerebral activity monitor of claim 1 in which said warning means comprises:
   A. a flip-flop having first and second conductivity conditions and connected to said level detector to be shifted from said first conductivity condition to said second conductivity condition when said warning means is actuated; and
   B. a warning device connected to said flip-flop to be placed in a continuous warning condition until said flip-flop is reset to said first conductivity condition.

7. The cerebral activity monitor of claim 1 in which said warning means is actuated to emit a first warning signal when the charge level of said time constant circuit reaches a predetermined actuating value, and said monitor comprises, in addition, a loose electrode detecting circuit connected to the output of said amplifier and tuned to respond to alternating current power line signals picked up by said input means if one of said electrodes becomes disengaged from said patient, said detecting circuit being connected to said warning device to actuate said warning device to emit a second warning signal noticeably different from the first warning signal as long as said electrode remains disengaged.

8. The cerebral activity monitor of claim 7 in which said loose electrode circuit comprises:
   A. a rectifying circuit connected to said electrodes to rectify said alternating current power line signals from said electrodes; and
   B. means connecting said rectifying curcuit to said warning device to actuate said warning device in response to rectified signals from said rectifying circuit.

9. The cerebral activity monitor of claim 8 in which said means connecting said rectifying circuit to said warning device comprises a pulsating circuit actuated in response to rectified signals from said rectifying circuit and connected to said warning device to actuate said warning device in pulsations.

10. The cerebral activity monitor of claim 9 in which said pulsating circuit comprises:
    A. a pulse generator connected to said rectifying circuit to be actuated in response to rectified signals therefrom; and
    B. a flip-flop circuit connected to said pulse generator to provide a pulsating signal, said flip-flop circuit being connected to said warning device to supply said pulsating signal thereto to actuate said warning device in pulsations.

11. The cerebral activity monitor of claim 10 in which said flip-flop circuit comprises a power supply input terminal and said monitor comprises, in addition, a transistor comprising an output circuit connecting said power supply input terminal to a power supply source terminal, said transistor also comprising an input circuit connected to be actuated in response to rectified signals from said rectifying circuit to cause said output circuit to be conductive.

12. The cerebral activity monitor of claim 7 comprising, in addition:
    A. a power supply;
    B. measuring means connected to said power supply to measure the output voltage thereof;
    C. a second warning device; and
    D. warning device connection means connecting said measuring means to said second warning device to supply a low-voltage warning signal to actuate said second warning device when the output voltage of said power supply is below a predetermined level.

13. The cerebral activity monitor of claim 12 in which said second warning device is a light-emitting diode, said monitor comprising, in addition, means connecting said measuring means to said first-named warning device to actuate said first-named warning device simultaneously with said light-emitting diode.

14. The cerebral activity monitor of claim 12 in which said warning device connection means comprises:
    A. a pulse generator connected to said measuring means to be activated thereby; and
    B. a flip-flop circuit connected to said pulse generator to produce a pulsating signal to actuate both said first-named warning device and said second warning device.

15. The cerebral activity monitor of claim 14 in which said warning device connection means further comprises:
    A. unidirectionally conductive means connected between said measuring means and said pulse generator to supply operating voltage to said pulse generator for the duration of said low-voltage signal; and
    B. pulse frequency modifying means to modify the natural frequency of said pulse generator to a second frequency.

16. The cerebral activity monitor of claim 15 in which said flip-flop circuit comprises a power supply input terminal and said monitor comprises, in addition a transistor comprising an output circuit connecting said power supply input terminal to a terminal of said power supply, said transistor also comprising an input circuit connected to said unidirectionally conductive means to cause said output circuit to be conductive for the duration of said low-voltage warning signal.

17. The cerebral activity monitor of claim 16 in which said loose electrode circuit comprises a rectifying circuit to rectify said alternating power line signals, said monitor further comprising:
    A. second unidirectionally conductive means connected between said rectifying circuit and said pulse generator to supply operating voltage to said pulse generator for the duration of rectified signals from said rectifying circuit;
    B. second pulse frequency modifying means to modify the natural frequency of said pulse generator to a third frequency; and
    C. disabling means connected to said rectifying circuit to be actuated thereby and connected to said second warning device to disable it from operating for the duration of rectified signals from said rectifying circuit.

* * * * *